Oct. 13, 1931.  J. FOLGAROLAS ET AL  1,827,645
RIM FOR AUTOMOBILE WHEELS
Filed Dec. 2, 1929
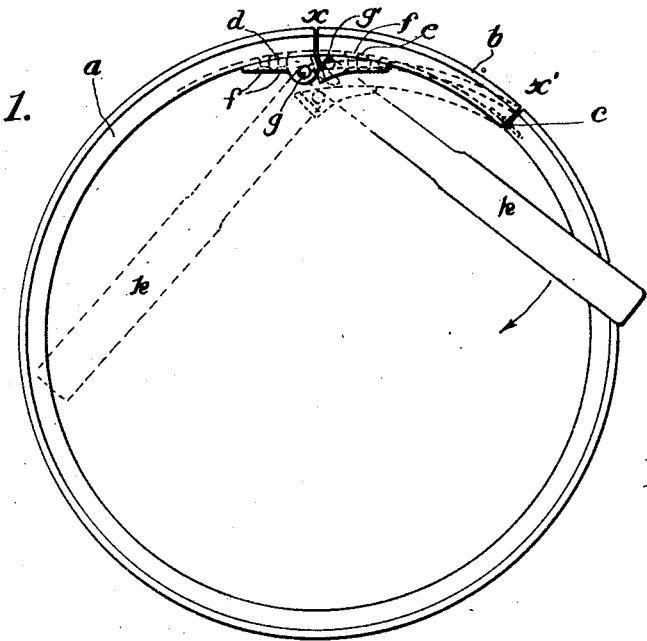
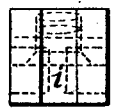
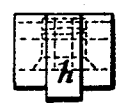
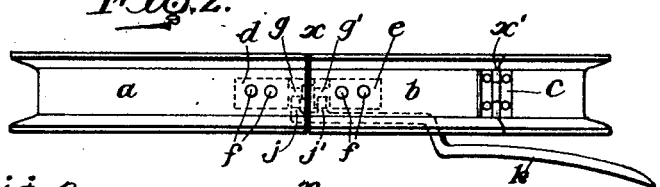
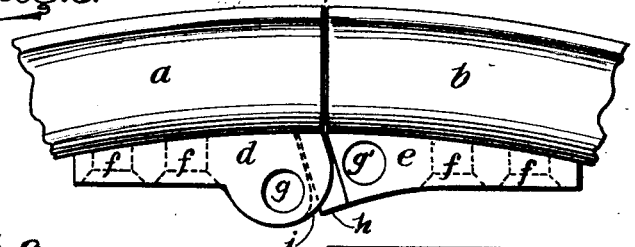
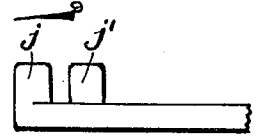
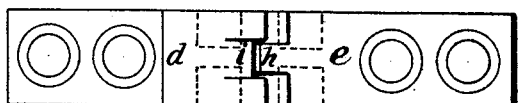
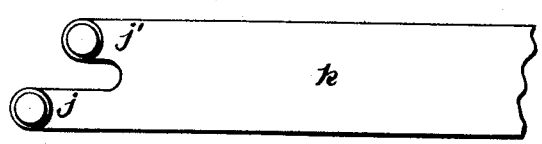
INVENTORS.
Jacinto Folgarolas
BY Antonio Folgarolas
Geo. P. Kimmel
ATTORNEY.

Patented Oct. 13, 1931

1,827,645

UNITED STATES PATENT OFFICE

JACINTO FOLGAROLAS AND ANTONIO FOLGAROLAS, OF MEXICO, MEXICO

RIM FOR AUTOMOBILE WHEELS

Application filed December 27, 1929, Serial No. 416,951, and in Mexico July 9, 1929.

This invention relates to a demountable rim for wheels of automotive vehicles, and has for its object to provide, in a manner as hereinafter set forth, a rim of the class referred to so constructed and arranged to enable the expeditious removal and replacing of a tire when occasion requires.

In the drawings wherein like reference characters denote corresponding parts throughout the several views:

Figure 1 is a side elevation of a demountable rim in accordance with this invention and further illustrating in full and in dotted lines a tool for shifting the split ends of the rim relative to each other.

Figure 2 is a view looking towards the outer face of the rim with the tool coupled therewith and with the rim closed.

Figure 3 is a fragmentary view in side elevation and upon an enlarged scale of the rim in closed position.

Figure 4 is a detail in elevation looking towards the active end of one of the coupling elements.

Figure 5 is a view similar to Figure 4 of the other coupling element.

Figures 6 and 7 are respectively a top plan and an inverted plan of the coupling elements.

Figures 8 and 9 are fragmentary views in top plan and side elevation respectively of the tool.

The rim as illustrated is split at the two points $x$, $x'$ to provide rim sections $a$ and $b$, the former being of materially greater length than the latter. At the point $x'$ one end of section $b$ is hinged to one end of the section $a$. The hinge for connecting section $a$ to section $b$ is indicated at $c$. The other or free ends of sections $a$ and $b$ at the point $x$ are detachably connected together by a pair of coupling elements, one indicated at $d$ and the other at $e$.

The body portion of each element is formed of a reduced part and an enlarged part. The enlarged part of element $d$ is substantially semi-oval. The enlarged part of element $e$ is of substantially triangular contour. The free end edges of said enlarged parts are inclined. The inclination of said ends being substantially the same. The elements $d$ and $e$ are oppositely disposed with respect to each other whereby the free ends of the enlarged parts of said elements will oppose each other. The element $d$ is carried by rim section $a$ and projects beyond the end of section $a$ at point $x$. The element $e$ is carried by rim section $b$ and projects beyond the free end of section $b$ at point $x$. The enlarged part of element $d$ is of greater height than the enlarged part of element $e$.

The reduced parts of elements $d$ and $e$ are provided with spaced openings through which extend holdfast devices $f$ for fixedly securing said elements against the inner faces of rim sections $a$ and $b$. The holdfast devices $f$ are countersunk in the openings through which they extend.

The element $d$ has its free end which opposes the free end of element $e$ formed with an inclined portion which terminates at its inner end in a rearwardly directed rounded portion. The inner end of the inclined portion projects beyond the free end of rim section $a$ and inclines rearwardly from its inner to its outer end towards the said free end of rim section $a$. The free end of element $d$ is formed with a groove $i$ having a part of its base or bottom disposed at the same inclination as the inclined end portion of element $d$ and such part terminates at its inner end into a part curving rearwardly with respect to and of less length than the inclined part.

The element $e$ has its free end which opposes the rounded free end of element $d$ provided with an upstanding, centrally disposed tongue $h$ for extension into the groove $i$. The tongue $h$ projects beyond the free end of rim section $b$ and inclines forwardly from its inner to its outer end with respect to said end of section $b$. The forming of the element $e$ with the tongue $h$ provides what may be termed a pair of shoulders at that end of element $e$ which is provided with the tongue. The shoulders are disposed at the same inclination as that of the tongue $h$.

The element $d$ in the enlarged part thereof is formed with an opening $g$ and the enlarged part of element $e$ is provided with an opening $g'$. One of said openings being farther inward radially from the rim web than the other opening, and the purpose of openings $g$, $g'$ will be presently referred to.

The tool for opening and closing the rim comprises a flat handle member $k$ having a bifurcated end provided with a pair of non-aligning studs or pins $j$, $j'$ for insertion in the openings $g$, $g'$ respectively.

It will be assumed that the rim is in the position shown in Figures 1 and 3 and that the studs or pins $j$, $j'$ are arranged in the openings $g$, $g'$ respectively. The tool being shifted in the direction of the arrow, Figure 1 will provide for element $e$ and rim section $b$ being shifted inwardly relative to rim section $a$ at point $x$ as section $b$ will turn at point $x'$ on hinge $c$. This action provides for the demounting of the rim whereby the tire, not shown, can be readily removed. When it is desired to close the rim, the studs or pins are positioned in the openings $g$, $g'$ and the tool shifted in a direction reverse to that indicated by the arrow.

Having thus described our invention, what we claim is:

In combination, a tire rim split at two spaced points to provide a pair of rim sections, means for hinging one end of one of said sections to one end of the other of said sections, a pair of oppositely disposed endwise opposed coupling elements, each secured to the inner face of one of said sections, the free ends of said elements projecting beyond the free ends of said sections, one of said elements having at its free end a tongue and a pair of shoulders, said tongue and shoulders inclining forwardly from their inner to their outer ends with respect to the free end of that rim section to which such element is secured, the other of said elements having its free end provided with a groove inclining rearwardly from its inner to its outer end with respect to the free end of that rim section to which such element is secured and into which extends said tongue, the free end of that element provided with the groove opposing said shoulders, and each of said elements provided with an opening, one of said openings being farther inward radially from the rim web than the other, and said openings adapted to receive a shiftable tool to provide for the fulcruming of said elements relatively to each other to demount and close the rim.

In testimony whereof we have affixed our signatures.

JACINTO FOLGAROLAS.
ANTONIO FOLGAROLAS.